July 4, 1961  H. F. WELSH  2,991,452
PULSE GROUP SYNCHRONIZERS
Filed March 2, 1956  3 Sheets-Sheet 1
FIG. 1.
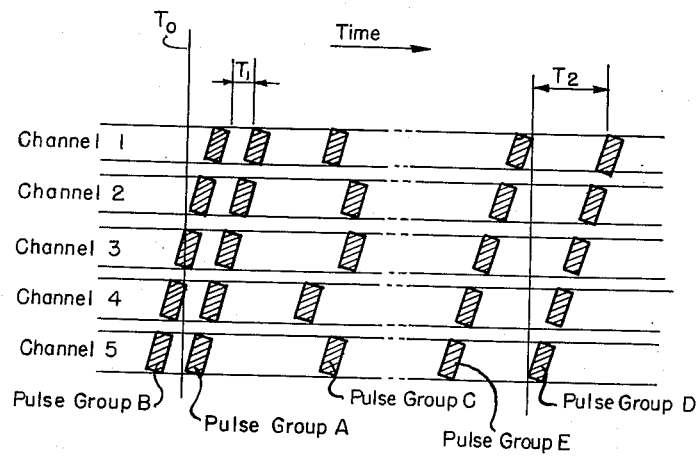
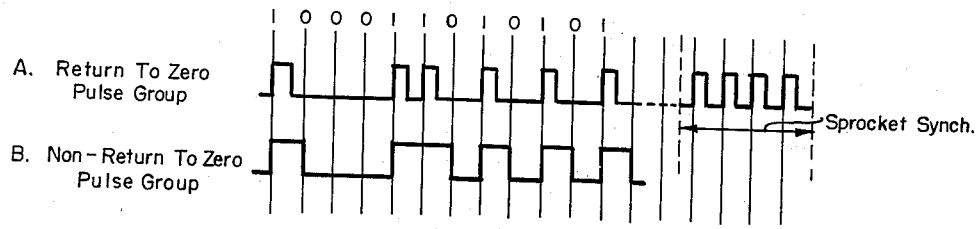
FIG. 2.
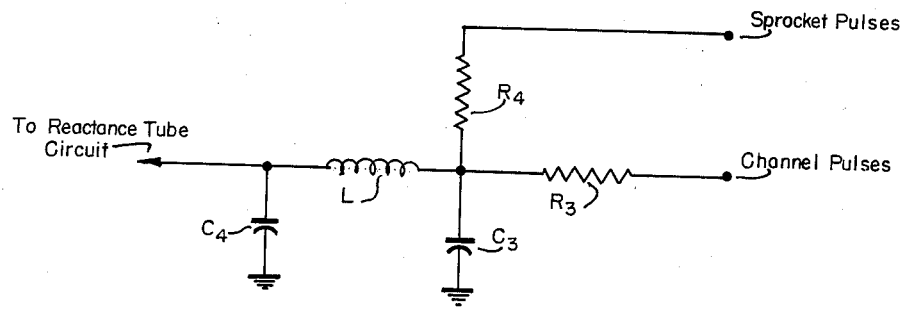
FIG. 5.
INVENTOR.
H. FRAZER WELSH
BY
Charles F. English
AGENT

INVENTOR.
H. FRAZER WELSH

July 4, 1961

H. F. WELSH 2,991,452

PULSE GROUP SYNCHRONIZERS

Filed March 2, 1956

INVENTOR.
H. FRAZER WELSH

BY

*Charles C. English*

AGENT

United States Patent Office 2,991,452
Patented July 4, 1961

2,991,452
PULSE GROUP SYNCHRONIZERS
Herbert Frazer Welsh, Philadelphia, Pa., assignor to Sperry Rand Corporation, New York, N.Y., a corporation of Delaware
Filed Mar. 2, 1956, Ser. No. 569,069
25 Claims. (Cl. 340—172.5)

The present invention relates to improved devices effecting synchronization and realignment of serial pulse groups received at a plurality of inputs to a multichannel utilization device such as a coding machine, a digital computer, or a magnetic tape reader, and is more particularly concerned with pulse group synchronizers of this general type which are adapted to compensate for phase distortion or "skew" in plural channel information systems.

In many forms of information systems, such as long-line transmission devices, multichannel tape mechanisms and the like, information is often recorded and/or transmitted as serial successions of pulse groups, the individual pulses of each group being transmitted simultaneously on a plurality of channels. The individual pulses comprising a group may be modulated in amplitude, duration or position, in conveying desired information, and in order to preserve the fidelity of information so transmitted, for instance by maintenance of a parallel relationship between the pulses comprising each group, it is necessary to control the frequency of the pulses in each channel and in addition to control the phase relationship of simultaneous pulses comprising each group on the plurality of channels.

In practice, the exact space-time relationship among multichannel information pulses cannot be maintained. In the case of long-line transmission systems, for instance, wherein individual pulses comprising a group are simultaneously transmitted on a plurality of different lines, inherent differences in line characteristics as well as variable external effects may cause an originally parallel group of pulses to be phase shifted with respect to one another, in a manner which cannot be predicted with accuracy. Similarly, in the case of multichannel magnetic tape devices, an angular positional variation between tape and transducer may be effected between an initial recording and subsequent reproducing operation, whereby the mechanical skew in the tape again destroys desired synchronization in the multichannel pulses.

Because of these possible phase variations in multichannel information transmission systems, it is necessary to adjust the response of receiver input circuits to the correct time scale of pulses at their arrival; and this may be accomplished for instance by simultaneous transmission, with the pulses comprising each pulse group, of the time scale on which the said pulses were originally propagated. Such a time scale may again comprise either a frequency or amplitude modulated control signal; or may, in the alternative, comprise a group of spaced clock or sprocket pulses on a separate control channel; and in either event, these clock or sprocket signals may be used to synchronize the reception time or scanning time of receiver inputs in a manner analogous to that of a mechanical sprocket.

The scanning period of input circuits employed in systems of the type described above may be correlated with the sprocket pulses by various means; but correction of phase distortion or "skew" among the simultaneously propagated information pulses of a given group is considerably more difficult. A number of systems have been previously suggested in an effort to control or tolerate possible skew in a multichannel system; and such prior systems have largely been based upon a phase comparison of the individual pulses comprising a pulse group with a sprocket pulse train belonging to that group. This comparison has in turn been employed to produce control signals proportional to a detected phase difference; and such control signals have in turn been employed to control delay circuits in various ways, or to gate the information pulses out of some holding device in a selected sequence. These prior methods of skew compensation are suitable only if there is no phase overlap between pulses of succeeding groups, and this requirement imposes a serious limitation on the maximum pulse density which may be employed in transmission or recording.

In addition, these prior systems ordinarily require a discrete pulse spacing, and are therefore not suitable for pulse envelope transmission systems or non-return-to-zero systems. Further, prior devices for skew compensation have been basically dependent upon a uniform phase displacement from line to line in a multichannel system; i.e., the pulses distributed over plural channels and comprising a pulse group each lead or lag the pulses in an adjacent channel by a fixed amount determined by the actual mechanical skew of the over-all transmission system. Again, this latter limitation of prior systems has not permitted skew compensation when the multichannel transmission is such that the pulses on the several lines comprising the multichannel system are not skewed or phase displaced in accordance with a uniform law.

In general, the minimum skew or phase distortion present in any given system is an inherent feature of that system; and inasmuch as the actual skew, which might occur during any given transmission operation cannot be predicted, presently known transmisison systems are completely incapable of achieving the high frequencies of transmisison or the pulse densities of recording which could be effected but for the skew.

The present invention provides a system adapted to compensate for the above discussed skew or phase distortion effects present in multichannel transmission systems whereby the several problems discussed above are overcome; and in so compensating for skew, the present invention performs the desired resynchronization of pulses in a simpler and more efficient manner than compensation systems suggested heretofore.

It is accordingly an object of the present invention to provide means for the synchronization and phase realignment of groups of information pulses received respectively on a plurality of channels.

Another object of the present invention resides in the provision of a structure adapted to effect phase realignment of pulse groups, this realignment being independent of the angle of skew and of the pulse density.

Another object of the present invention resides in the provision of an input synchronizing system which is independent in its operation of differences in phase lag or lead among the transmitted information bits.

Another object of the present invention resides in the provision of a skew compensation system which may be employed in the synchronization of either pulse envelope systems or of discrete pulse systems of information transmissions.

A still further object of the present invention resides in the provision of transmission systems which permit the recording and reproducing of information at higher pulse densities than has been the case heretofore.

Still another object of the present invention resides in the provision of skew compensating circuits which may be employed in the synchronization of pulse groups received from multichannel magnetic tapes, or from other forms of plural line transmission networks.

Another object of the present invention resides in the provision of a transmission, recording, and/or reproducing system having better and more efficient operation than has been the case heretofore.

In providing for the foregoing objects and advantages, the present invention contemplates the provision of a skew compensating network adapted for use with various multichannel information systems and comprising a plurality of plural stage storage devices or registers associated respectively with the several transmission lines. The serial pulses comprising pulse groups, which are received in succession on the several channels or lines of the aforementioned transmission system, are fed respectively to the registers associated with these lines or channels; and these serial pulses are adapted to be stored temporarily in the said registers. It will be appreciated that due to skew effects or phase distortion between the several pulses comprising each pulse group, the aforementioned registers will receive information pulses at differing times within a pulse period; and the received pulses act to fill the said registers during these variable or different times.

In accordance with the present invention, a circuit is provided which is responsive to the condition wherein each of the registers is filled with information; and upon occurrence of such a condition, means are provided for simultaneously reading the stored information out of the plural registers. By such a system, therefore, skew effects in the transmission of pulses merely serve to vary the time during which an individual register is being filled with information; and once all registers are so filled, synchronization or realignment of the pulses comprising the several groups is effected by a simultaneous read-out operation from the several registers. In accordance with a particular feature of the present invention, this read-out operation from the several registers may occur at a considerably higher repetition rate than that characterizing the pulses in the received groups.

The foregoing objects, advantages, construction and operation of the present invention will become more readily apparent from the following description and accompanying drawings, in which:

FIGURE 1 is a schematic representation of possible skew effects in a multichannel transmission or recording system.

FIGURE 2 (A and B) illustrates possible pulse configurations for the pulses comprising each group of FIGURE 1.

FIGURE 5 is a schematic representation of a modified form of frequency comparator which may be employed in the arrangement of FIGURE 4.

Figure 3:
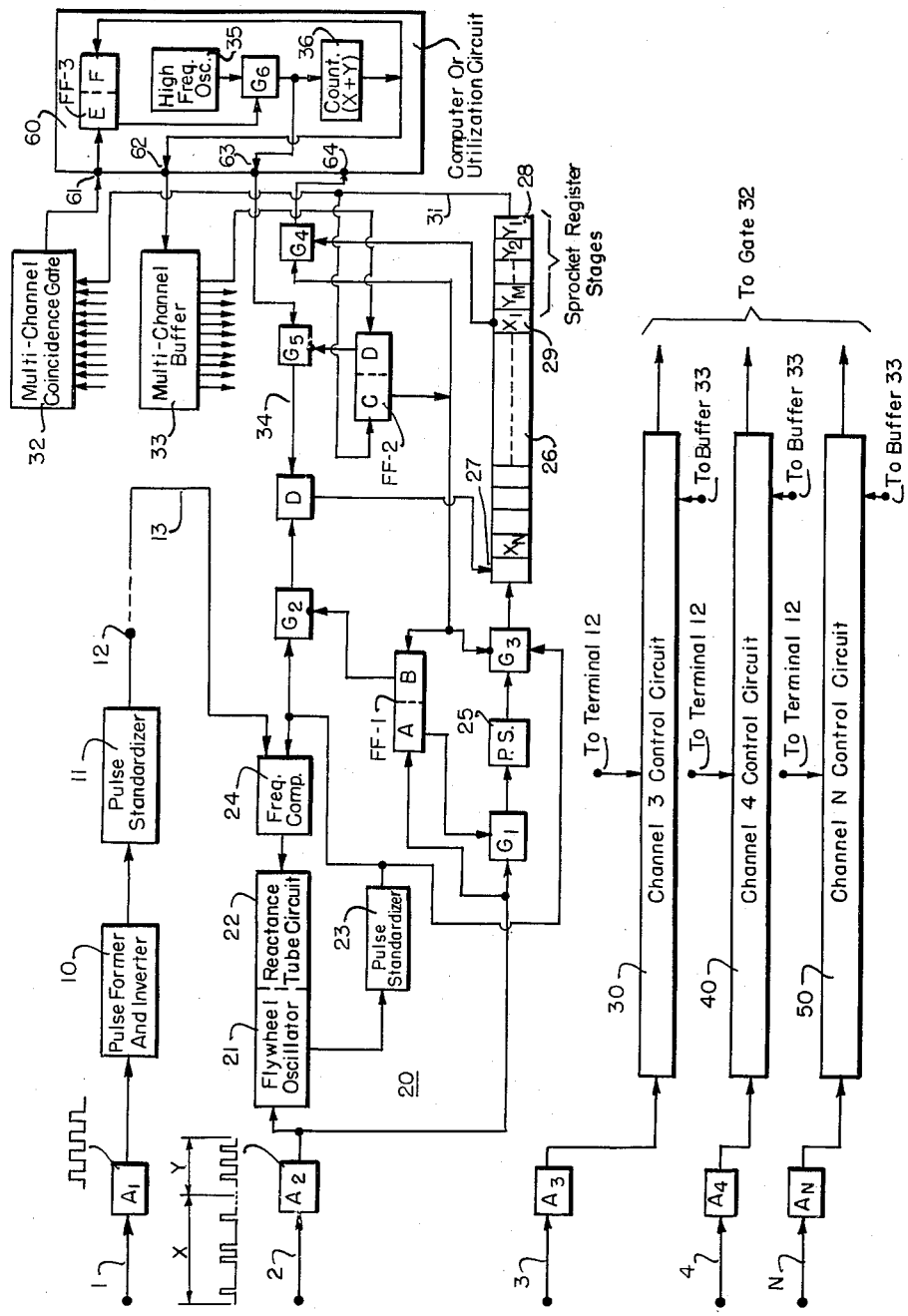
FIGURE 3 is a logical diagram of a pulse group synchronizer or skew compensator in accordance with the present invention.

Referring now to FIGURE 1, it will be seen that a plurality of transmission channels, such as channels 1 through 5 inclusive, may contain information in the form of pulse groups A, B, C, D and/or E. The several groups illustrated in FIGURE 1 are not meant to illustrate any particular transmission sequence, but are merely illustrative of possible skew effects which could occur due to various phenomena in multichannel transmission or recording systems. The several pulses in each channel may comprise a return-to-zero pulse group of the type illustrated in FIGURE 2A; or may, in the alternative, comprise a non-return-to-zero pulse group of the type illustrated in FIGURE 2B, it being understood that the representation in FIGURE 2B corresponds to that of FIGURE 2A, but with appropriate changes in waveform in accordance with the different types of pulse trains being represented.

Returning to FIGURE 1, it will be seen that the skew may be such that the pulses comprising each group uniformly lead or lag adjacent pulses in adjacent channels; and such skew has been illustrated by pulse groups A, B, D and E. This type of uniform skew is particularly to be found in multichannel magnetic recording and reproducing systems wherein angular deviations may occur during a recording and subsequent reproducing operation between a multichannel tape and a transducer; and it will be understood that but for the aforementioned skew, the several pulses comprising pulse groups A through D inclusive would occur simultaneously in time whereby the said pulse groups would be substantially vertical.

In the alternative, the skew may be such that the several pulses in each group variably lead or lag pulses in adjacent groups; and this possible skew or phase distortion is illustrated by pulse group C and might occur, for instance, in long-line transmission networks wherein trains of pulses are simultaneously transmitted on plural lines with the individual pulses of each group in each line having related pulses in the pulse trains appearing on other lines, thereby to form pulse groups.

When the skew is of the type illustrated by pulse groups A and B, the two pulse groups may be separated, for instance by a time T1 corresponding to the remainder of the pulse time cycle in which there is no signal, and at this time spacing there is a phase overlap of almost three cycles between the pulse groups A and B, as illustrated by the line T0. This possible phase overlap between successive pulse groups effects a serious limitation on the possible pulse density in the transmission system; and a minimum remainder time T2 is required to avoid phase overlap between successive pulse groups, this minimum remainder time being illustrated in conjunction with pulse groups D and E. The actual minimum remainder time T2 is a variable, depending upon the skew which might possibly occur in the system; and as a practical matter, therefore, transmission, recording and/or reproducing systems known heretofore had to be designed to tolerate the maximum possible skew which could occur whereby the resulting efficiency of transmission was appreciably decreased.

The aforementioned skew effects, whether uniform (pulse groups A, B, D and E) or non-uniform (pulse group C) may be completely compensated in accordance with the present invention by the use of a network adapted to realign the pulse groups comprising a plurality of pulse trains in a group of registers whereby synchronization of the said pulses may be re-established by a simultaneous read-out of the several registers after they have stored the received pulses therein. One such arrangement is illustrated in FIGURE 3.

Thus, referring to FIGURE 3, it will be seen that trains of pulses may be received on a plurality of channels 1, 2, 3, 4, . . . N, representative of a multichannel magnetic tape or of plural substantially independent transmission lines, and these trains of pulses may be coupled respectively via amplifiers A1, A2, A3, A4, . . . AN to a control network, taking generally the configuration illustrated. Channel 1 is assumed to comprise a sprocket channel and, in accordance with the invention, a group of regularly spaced sprocket pulses may be transmitted and received on this channel, these sprocket pulses being associated with each pulse group and acting as a time base for the received information pulse groups. The output of amplifier A1, comprising spaced sprocket pulses, is coupled via a pulse former and inverter 10 to a pulse standardizer or pulse shaper 11; and inverted, standardized sprocket pulses appear at a terminal 12 associated with sprocket channel 1. Channels 2, 3, 4, . . . N comprise information channels receiving trains of information pulses; and the outputs of amplifiers A2, A3, A4, . . . AN associated with these information channels, are coupled via control circuits 20, 30, 40, . . . 50, and eventually are utilized in a computer or utilization circuit 60, in the manner which will be described.

Control circuits 20, 30, 40 and 50 are identical, and for purposes of clarity a detailed representation of channel 20 only has been illustrated. Before proceeding with a description of channel 20, however, it should be noted that, in the practice of the present invention, each of the information pulse trains received by channels 2, 3, 4, . . . N is assumed to comprise a predetermined number of pulses arbitrarily termed X; and in FIGURE 2A for instance, this number X is twelve. In addition, each information pulse train appearing on the several information channels is preceded by an arbitrary but fixed number of spaced synchronization pulses, Y in number; and, in the particular example of FIGURE 2A, Y has been selected as four. Thus, the total time allotted for the reception of any given pulse train is $X+Y$.

Returning now to the logical diagram of FIGURE 3 and examining with particularity the control circuit 20, it will be seen that the output of amplifier A2, comprising, as discussed, a predetermined number Y of sync. pulses followed by a predetermined number X of information pulses (and/or spaces), may be coupled to a flywheel oscillator 21 as well as to a gate G1, and to the A input side of a flip-flop FF-1. Flywheel oscillator 21 may take the form of circuit commonly employed in television synchronous generators, and the actual frequency of the said oscillator 21 is controlled by a reactance tube circuit 22 coupled thereto. The output of flywheel oscillator 21, comprising spaced control pulses of controlled frequency, is coupled via pulse standardizer or pulse shaper 23; and the output of the said pulse standardizer 23 is coupled to one input of a frequency comparator 24 as well as to one input each of inhibition gates G2 and G3.

Another input to frequency comparator 24 is obtained via line 13 from output terminal 12; and, as will be seen from examination of the control channels 30, 40 and 50, the sprocket pulses so appearing at terminal 12 are in fact coupled, via lines similar to 13, to each of the control circuits associated with the several information channels. Frequency comparator 24 thus serves to effect a comparison between the frequency of sprocket pulses appearing at terminal 12 and oscillator pulses appearing at the output of pulse standardizers such as 23, in each control circuit, and the said frequency comparator produces a control potential which is utilized via reactance tube circuits such as 22 to control the frequency of the flywheel oscillator, such as 21, in each control circuit. This operation will become more apparent as the description proceeds.

Flip-flop FF-1, discussed above, selectively produces, at its A output side, a control signal which is coupled to one input of gate G1; or in the alternative, produces an output from its B side which is coupled to an inhibition terminal of gate G2. The output of gate G1, when it occurs, is coupled, via a pulse shaper 25, to an input of the aforementioned gate G3; and the output of gate G3 is in turn coupled to the input of a shifting register 26. The output of gate G2 is coupled, via delay means D, to a shift terminal 27 of the said shifting register 26.

The shifting register 26, which is typical of similar registers appearing in each of control circuits 30, 40 and 50, comprises a predetermined number of stages $X+Y$; that is, the number of stages in shift register 26 is equal to the summation of the sync. pulses plus possible information pulses which may appear in any given one of the information channels 2, 3, 4, . . . N during reception of a given pulse group. When the shift register 26 is completely filled with information, the first received sync. pulse will thus be stored in a register position or stage 28, while the first possible received information pulse will be stored in a register position or stage 29.

Register position 28 is coupled via line 31 to the C input side of a flip-flop FF-2 as well as to one input of a multichannel coincidence gate 32; the other inputs of the said gate 32 being derived from the outputs of the shifting registers in control circuits 30, 40 and 50, for instance, as indicated in FIGURE 3. The output of the C side of flip-flop FF-2 is coupled to an inhibition terminal of the aforementioned gate G3 as well as to the B input of the aforementioned flip-flop FF-1. The said C output of flip-flop FF-2 is also coupled to one input of a coincidence gate G4, while the other input to the said coincidence gate G4 is derived from shifting register position 29. The output of gate G4 is coupled to the aforementioned computer or utilization circuit 60; and the said circuit 60 includes a control input terminal 61 responsive to outputs from coincidence gate 32, and further includes output terminals 62 and 63, the function of which will be described. The output terminal 62 of circuit 60 is coupled to an input of a multichannel buffer 33, and the outputs of multichannel buffer 33 are coupled in similar fashion to the several control circuits 20, 30, 40 and 50, a typical such output being coupled to the D input side of the aforementioned flip-flop FF-2. The output of the D side of flip-flop FF-2 provides selectively an inhibition input to gate G5; and another input to the said gate G5 is provided from output terminal 63 of the computer or utilization circuit 60. The output of gate G5 is coupled via line 34 to the aforementioned shift terminal 27 of register 26.

Examining now the operation of the circuit in its entirety, let us assume that groups of skewed pulses are received on the input channels 1 through N, these pulses comprising spaced sprocket pulses on channel 1, and X information pulses preceded by Y sync. pulses on each of channels 2, 3, 4, . . . N. The sprocket pulses appearing at the output of amplifier A1 are inverted in circuit 10 and are shaped in circuit 11 whereby they appear in inverted and shaped form at terminal 12 and are thereafter coupled via line 13 to one input of frequency comparator 24. As mentioned, the transmission of a given block of information is begun with a definite and arbitrary number Y of non-information pulses or "1's," sufficient in number to adjust the frequency of flywheel oscillator 21 and to lock the said oscillator in phase with the transmitted channel pulses following the preliminary sync. pulses in each channel.

This locking in phase is achieved as follows. The several non-information pulses, Y in number, are coupled to the input of flywheel oscillator 21 whereby the said oscillator commences producing a phase stabilized oscillatory output. This oscillatory output is coupled via pulse standardizer 23 to one input of frequency comparator 24, the other input of the said frequency comparator 24 being derived via line 13 from sprocket terminal 12. The output of frequency comparator 24 comprises a control signal determined by the phase displacement between a given preliminary sync. pulse in information channel 2, for instance, and a corresponding sprocket pulse in sprocket channel 1; and this control output of circuit 24 adjusts the reactance tube circuit 22, thereby to vary the frequency of oscillator 21 until the said oscillator 21 produces outputs in synchronism with the Y sync. pulses. As mentioned, the number of Y pulses is so chosen as to be sufficient to so adjust the frequency of oscillator 21, and once the said oscillator is so adjusted, its frequency will be maintained and adjustments in phase will be effected by the occasionally appearing information pulses in the group X.

It will be appreciated that due to skew effects between the several information channels, the actual output of oscillator 21 will be phase shifted from the outputs of corresponding flywheel oscillators in control circuits 30, 40 and 50, and this phase shift will correspond to the actual skew present between adjacent channels of the multichannel system. The output of pulse standardizer 23, once preliminary synchronization is achieved, will thus comprise a train of regularly occurring clock pulses directly related to the phase and frequency of information pulses being received in its associated channel.

The first Y pulse appearing at the output of amplifier A2, in addition to being coupled to the input of flywheel oscillator 21, is also coupled to an input of coincidence gate G1 and to the A input side of flip-flop FF-1. Flip-flop FF-1 as well as the other flip-flops in the circuit, is so chosen that it responds to an input signal of lower level than that required to actuate the several gates in the circuit, whereby this first Y pulse causes the A side of flip-flop FF–1 to commence producing an output which is coupled to one input gate G1, at the same time that the said first Y pulse is being applied to another input of gate G1. The coincidence of signals thus applied to gate G1 effects an output from the said gate G1 whereby the first Y pulse passes through pulse shaper 25 and through uninhibited gate G3 to the first input position of register 26.

The output of pulse standardizer 23, in addition to being coupled to gate G3, thereby to permit the passage of the first Y pulse to the resister 26, is also coupled to an input of gate G2 and it will be appreciated that the said gate G2 is now uninhibited due to the setting of flip-flop FF–1 to its A output state. This pulse from pulse standardizer 23 therefore passes through gate G2 and thence via delay means D to the shift terminal 27 of register 26, the delay means D being provided to hold the register shift until an information pulse has already been recorded in the first stage thereof. The output from delay means D, acting as a shift input to register 26 at terminal 27, thus shifts the first Y pulse to the next stage of the register.

As mentioned previously, register 26 comprises, in all, an $X+Y$ number of stages, and the foregoing sequence of information storage and subsequent information shift continues throughout the reception of a given pulse train comprising $X+Y$ pulses in a given information channel. When the register 26 is filled, therefore, the signals contained therein will comprise a number Y of non-information "1's," followed by a number X of possible information pulses, with the first non-information pulse being stored in register position 28 while the first possible information pulse is stored in register position 29.

This storage of a non-information pulse in register position 28, representative of the register 26 being full, produces an output on line 31 which is coupled to one input of multichannel coincidence gate 32 and which is also coupled to the C input side of flip-flop FF–2. The said flip-flop FF–2 thus produces an output from its C side which is coupled to gate G4, thereby to open the said gate to information appearing at register position 29; and the said C output of flip-flop FF–2 is also coupled to an inhibition or jam terminal of gate G3, as well as to the B input side of flip-flop FF–1. The jamming of gate G3 thus positively prevents any further pulses from being fed to the input of register 26, while the B input to flip-flop FF–1 causes a B output to the inhibit terminal of gate G2 thereby preventing any further register shift pulses from being coupled via the said gate G2 to register shift terminal 27. In short, once the register 26 is filled with information and non-information pulses, one input is provided to multichannel coincidence gate 32, and the remainder of the control circuit is positively inhibited from coupling additional information into the channel register or from shifting that information.

Multichannel coincidence gate 32 produces no output until a simultaneity of inputs are provided thereto from all the control circuits 20, 30, 40, 50, etc. Thus, once a given channel register is filled with information, further activity ceases in that channel until all of the channel registers are similarly filled. Upon this filling of all channel registers, the required coincidence of inputs to gate 32 is effected from the last register position, corresponding to 28 in the several channel registers, whereby gate 32 produces an output which is coupled to input terminal 61 of computer or utilization circuit 60. In this respect it should be noted that, while the control circuits now to be described are included as a portion of computer or utilization circuit 60, they may in fact be external to and independent of circuit 60.

This coupling of an input to utilization circuit 60 is adapted to produce a high frequency read-out signal from the said circuit 60, which read-out signal may be employed to rapidly clear the several registers of their information, with corresponding stages of the several registers being read simultaneously to restore the desired synchronism of pulses. In accordance with one arrangement providing this function, the output of gate 32 may be utilized as an E input to a flip-flop FF–3, whereby the said flip-flop FF–3 produces an E output opening a coincidence gate G6. The other input to the said gate G6 is derived from a high frequency oscillator 35, preferably having a repetition rate appreciably in excess of the pulse rate appearing in the several information channels; and this high frequency read-out signal is coupled via output terminal 63 to one input of gate G5 (which is now uninhibited since flip-flop FF–2 is in its C output state), and thence via line 34 and delay means D to the shift terminal 27 of register 26. The output from terminal 63 is of course also applied through similar G5 gates in the other circuits to corresponding shift terminals in the channel registers associated with control circuits 30, 40, 50, etc.

An extremely rapid shifting of information through register position 29 thus occurs, and this successive pulse information is coupled via gate G4 to an input terminal 64 of utilization circuit 60. Although not illustrated, similar G4 gates and utilization circuit input terminals are provided for the other circuits 30, 40, 50, etc. It will be appreciated that since read-out does not occur until all registers have been filled, and inasmuch further as read-out occurs simultaneously from all these registers, the information inputs to the several input terminals 64, derived from the several register positions analogous to 29, comprise groups of pulses which are now synchronized or realigned.

The output of gate G6, comprising high frequency read-out pulses from oscillator 35, is also coupled to an input of a counter 36 adapted to produce an output after $X+Y$ pulses have been applied thereto. This count for the circuit 36 is selected to assure that each of the registers is completely cleared of both information and non-information pulses before the over-all skew compensator is reset to permit reception of a further block of pulses. After $X+Y$ read-out pulses have been counted by circuit 36, the said circuit 36 produces an output which is coupled to the F input side of flip-flop FF–3 thereby closing gate G6; and the said output of circuit 36 is also coupled via output terminal 62 of circuit 60 to the input of multichannel buffer 33. The outputs of multichannel buffer 33 are coupled to the several control circuits 20, 30, 40, 50, etc. and serve to reset these circuits. In particular, one such output from buffer 33 may be coupled to the D input side of flip-flop FF–2 whereby the said flip-flop FF–2 shifts to a D output producing state thereby inhibiting gate G5 to prevent further shift signals being applied via line 34; and also removing the jam input from gate G3.

To summarize the over-all operation of the circuit thus illustrated in FIGURE 3, it will be seen that received pulse trains individually serve to synchronize a plurality of control circuits whereby the timing for each control channel is individually determined by the actual phase displacement of pulses in a given input channel. Input pulses are thereafter coupled to a channel register and are stored in that register and maintained in storage until all channel registers are filled with information, thereby to positionally realign the several pulse groups. When this realignment has been completed, the over-all circuit rapidly and successively reads information out of the several registers simultaneously, and thereafter serves to reset the entire circuit to its original state, preparatory to reception of a new block of pulses.

It should be noted that the space between transmitted information blocks must be sufficient for the high frequency shift pulse, derived from oscillator 35, to gate all information out of the registers after the last channel register is filled. This spacing between information blocks will naturally increase with the length of the information blocks, with skew, and with the frequency of channel sprocket pulses or rate of transmission. It will decrease, however, with increasing frequency of the high frequency shift pulses, and this provision of high frequency read-out thus contributes to the improved pulse density which may be achieved in recording, reproducing and/or transmission systems in accordance with the present invention.

The several gates, flip-flops, registers, pulse shapers, oscillators, buffers, etc. may assume conventional circuit configurations well known in the art. Similarly, the several elements 10, 11, 21, 22, 23 and 24 are generally well known. By way of example, however, one preferred circuit arrangement has been shown in FIGURE 4. Thus, referring to FIGURE 4, it will be seen that incoming sprocket pulses appearing on sprocket channel 1 may be coupled via amplifier A1 to a pulse former and inverter comprising essentially a multivibrator of the delay flop type with a diode-coupled differentiator input circuit. These input sprocket pulses may thus be differentiated across the network comprising capacitor C1 and resistor R1, and may be limited by a diode D1 whereafter they may be applied to the input of a tube V1 comprising one side of delay flop V1—V2. The tube V1 is normally maintained at an operating point just below conduction by a negative bias applied to the grid of the said tube V1 via resistor R2; and in response to application of a pulse via diode D1 to the said grid of V1, the said tube V1 is driven into conduction thereby cutting off tube V2 and producing an output pulse on line 14.

The circuit V1—V2 comprises an unbalanced trigger circuit of a form generally well kown in the art, and the output of tube VI on line 14 continues until the circuit flops back to its original stable state, after lapse of a time period determined by the circuit constants. Thus, each sprocket pulse appearing at the output of amplifier A1, produces a corresponding inverted output pulse appearing on line 14; and these inverted pulses are passed to pulse standardizer or shaper 11 where they are limited as to both their positive and negative levels by limiter circuit D2—D3; and are thence coupled via rectifier D4 to cathode follower 15. The output pulses thus appearing at terminal 12 and taken across the cathode circuit of cathode follower 15, comprise a series of inverted, shaped sprocket pulses.

The sync. pulses and information pulses appearing in channel 2 are similarly coupled via amplifier A2, and thence via differentiator circuit C2—R2 and diode D5 to the input of a flywheel oscillator comprising tube V3. This flywheel oscillator is of a circuit configuration generally well kown in the television arts; and the output frequency of the said flywheel oscillator may be controlled by a reactance tube circuit 22 comprising tube V4 and its associated components, which is coupled across the tank circuit of flywheel oscillator 21. The output of flywheel oscillator 21 is taken on line 16 and is coupled to pulse standardizer 23, where it is limited by network D6—D7 and is thence coupled via rectifier D8 to the input of cathode follower 17.

The output of cathode follower 17 is coupled to frequency comparator 24, and this output from the said cathode follower 17 is developed across a resistor R3. Similarly, the sprocket output appearing at terminal 12 from pulse standardizer 11 is coupled to the said frequency comparator 24 and is developed across a resistor R4. The signals thus applied to the resistors R3 and R4 are of equal width and of opposite amplitude but are presumably not in phase, at least initially, whereby the resultant voltage appearing across resistors R3 and R4 is integrated by the circuit comprising capacitor C3 and resistor R5; and this integrated signal acts as a control signal which is coupled to the grid of tube V4 comprising reactance tube circuit 22, thereby to adjust the output frequency of flywheel oscillator 21. This adjustment continues, of course, until the pulses across resistors R3 and R4 are substantially of the same phase, whereafter no input is applied to reactance tube circuit 22 and the output of flywheel oscillator 21 is effectively in synchronism with the pulses appearing at input channel 2. This synchronism may, as mentioned previously, be maintained by subsequent information pulses arriving on channel 2 and passed via amplifier A2 to the grid of tube V3 in flywheel oscillator 21; and these information pulses serve to assure phase lock of the oscillator 21 with the incoming channel pulses by lifting the voltage rise curve of the oscillator grid.

It is desirable that the RC constant of the integrating circuit C3—R5 in frequency comparator 24 be kept small in order not to slow the action of the comparator circuit unduly. In addition, it may be necessary to introduce additional filtering action in the output of the comparator 24 to smooth any ripple voltage resulting from the phase difference of the entering pulses at the two input terminals of the frequency comparator. This may be accomplished by an arrangement such as that shown in FIGURE 5 wherein, as before, sprocket pulses are developed across a resistor R4 and channel pulses are developed across a resistor R3; and in the particular arrangement of FIGURE 5, the resistor R5 is replaced by a choke L and a shunt capacitor C4 whereby the resultant network of C3—C4 and L serves to provide the desired filtering action.

While I have described a preferred embodiment of the present invention, many variations will be suggested to those skilled in the art. In particular, it will be appreciated that for the particular form of frequency comparator 24, illustrated in FIGURE 4, the sprocket pulses in channel 1, occurring at terminal 12 (FIGURE 3), should be of a continuous nature and should occur throughout a complete block of information being resynchronized. If the sprocket pulses are not continuously received in channel 1 for comparison purposes, a bias will tend to be developed on the control grid of tube V4 which would shift the frequency of flywheel oscillator 21. Through modification of the circuits shown in FIGURES 3 and 4, however, continuity of sprocket pulses at terminal 12 is no longer required.

Figure 4:
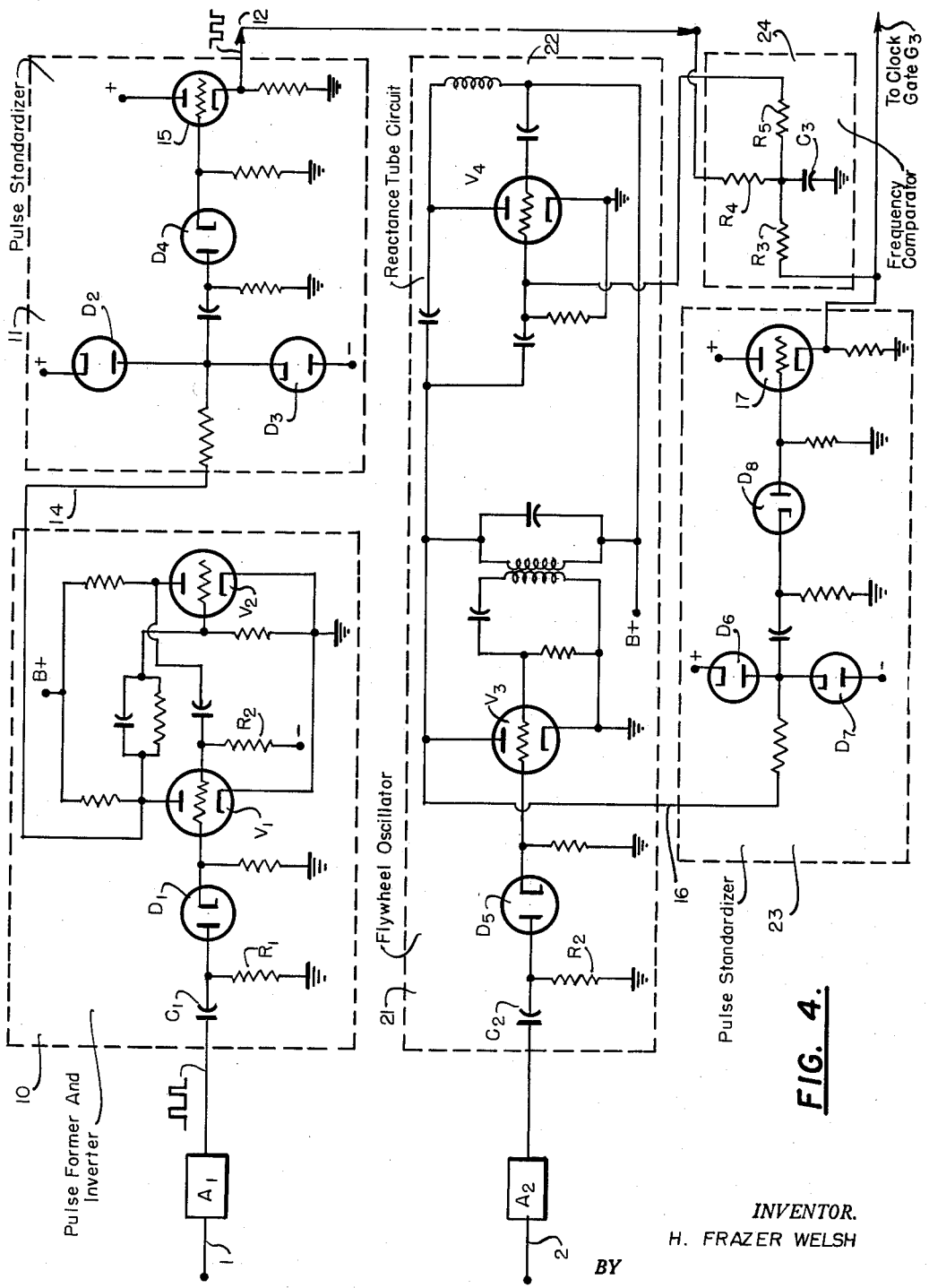
FIGURE 4 is a schematic diagram of some circuits which may be employed, if desired, in the arrangement of FIGURE 3.

More specifically, and referring to FIGURE 4, it will be noted that switching means or gates may be introduced in the lines coupled to resistors R3 and R4 of frequency comparator 24, and such switching means may serve to disconnect the frequency comparator 24 from the sprocket and channel pulse sources, upon receipt of a first information pulse. The charge on capacitor C3 will then be maintained at whatever value had been established during the comparison period so that the flywheel oscillators associated with the several channels may operate to coast through the information period without further correction. The aforementioned switching elements or gates, coupled to the inputs of frequency comparator 24, may in turn be controlled by a flip-flop which is set from a stage in the register 26 disposed Y spaces from the front of the register, and this controlling flip-flop could thereafter be reset by a pulse appearing on line 31 (FIGURE 3).

In accordance with a still further modification, it will be appreciated that the frequency comparator 24 may comprise an AFC type of discriminator having a discharge time constant of sufficient duration to permit the correction, occurring at the beginning of a block of information, to hold the oscillator in step for the duration of the block. Through use of either of these modified forms of frequency comparator circuits, the sprocket pulses in channel 1 may be discontinuous in nature, and may in fact be limited in occurrence to the beginning of a given information sequence.

Still other modifications in the several circuits comprising my invention, as well as in the disposition of those circuits, will become apparent, and it must accordingly be stressed that the foregoing description is meant to be illustrative only and should not be considered limitative of my invention. All such variations as are in accord with the principles described are meant to fall within the scope of the appended claims.

Having thus described my invention, I claim:

1. In a multichannel formation circuit wherein trains of spaced input pulses are received on a plurality of input lines respectively, a plurality of plural stage storage registers coupled respectively to said input lines, means for independently controlling the storing of the individual spaced pulses of said input pulse trains in different individual stages of said plural stage registers respectively, read-out means coupled to said registers, and control means responsive to the storage of said pulses in the same stage of each of said registers for operatively controlling said read-out means thereby to effect simultaneous read-out of said stored pulse trains from all said registers.

2. In a multichannel information circuit wherein trains of input pulses are received on a plurality of input lines respectively, a plurality of plural stage storage registers coupled respectively to said input lines, means for storing said input pulse trains in said plural stage registers during differing time intervals, read-out means coupled to said registers, said read-out means comprising means producing a high frequency register shift signal, the repetition rate of said register shift signal being in excess of the repetition rate of pulses in said input pulse trains, and control means responsive to completion of pulse train storage in all of said registers for operatively controlling said read-out means thereby to effect simultaneous read-out of said stored pulse trains from all said registers.

3. The circuit of claim 2 including utilization means coupled to a preselected stage in each of said registers, whereby read-out of said stored pulse trains is effected by the successive shifting of said pulse trains into the said preselected stage of said registers by said high frequency register shift signal.

4. In a multichannel information circuit wherein trains of input pulses are received on a plurality of input channels respectively, each of said trains comprising a plurality of control pulses followed by a plurality of possible information pulses, a plurality of control circuits coupled to said plurality of input channels respectively, each of said control circuits comprising a flywheel oscillator and a shifting register, means responsive to received control pulses in each of said channels for controlling the output of said flywheel oscillator, coupling means coupling said input pulses to said registers respectively, means responsive to the oscillator output in each of said channels for shifting pulses stored in the registers of said control circuits, and means in each of said control circuits responsive to shift of an input pulse into a preselected register stage for preventing further shift of pulses in said register.

5. The circuit of claim 4 wherein said coupling means comprises gating means, said gating means being responsive to said oscillator output for coupling said input pulses to said register during spaced time intervals controlled by the repetition rate of said oscillator, and means responsive to shift of an input pulse into said preselected register stage for preventing further coupling of input pulses via said gating means to said register.

6. The circuit of claim 4 including means producing a control signal in response to the coincident storage of an input pulse in said preselected stage of each of said registers, and means responsive to said control signal for effecting simultaneous read-out of pulses stored in said registers.

7. The circuit of claim 6 wherein said last named means comprises means coupled to each of said registers and selectively producing a high frequency read-out signal, the repetition rate of said read-out signal being appreciably in excess of the pulse repetition rate of said input pulse trains.

8. In a pulse group synchronizer wherein phase displaced trains of successive input pulses are received on a plurality of input lines, a plurality of plural stage storage devices coupled to said input lines respectively, means independently controlling the storing to aid successive pulses of said trains of pulses in different individual stages of each of said plural stage storage devices, and control means responsive to the coincident storage of an input pulse in a preselected stage of each of said devices for effecting simultaneous successive read-outs of different groups of said pulses stored in said devices.

9. The combination of claim 8 wherein said last named means includes means producing a high frequency read-out signal for effecting said read-out at a rate in excess of the rate of storing of said trains of pulses in said devices.

10. The combination of claim 9 including a coincidence gate responsive to said coincident storage of input pulses for controlling occurrence of said read-out signal.

11. The combination of claim 8 wherein said plurality of input lines comprises a plurality of recording channels in a magnetic tape.

12. The combination of claim 8 wherein each of said storage devices comprises a shifting register, a utilization device, said control means comprising means shifting stored pulses out of said register to said utilization device.

13. In a pulse group synchronizer wherein phase displaced trains of successive input pulses are received on a plurality of input lines, a master oscillator coupled to each of said input lines, each of said input pulse trains including control pulses, a source of regularly occurring sprocket pulses, means responsive to the phase difference between said control pulses and said sprocket pulses for varying the output of said master oscillator, a plurality of plural stage storage devices coupled to said input lines respectively, means storing each of said trains of pulses in one of said storage devices, said storing means including first control means responsive to said oscillator output for controlling the storage of said input trains in said storage devices, and second control means responsive to the coincident storage of an input pulse in a preselected stage of each of said devices for effecting simultaneous read-out of the stored pulses in said devices.

14. The combination of claim 13 wherein said last first control means comprises gating means coupling input pulses to a first stage of said storage devices during spaced time intervals under the control of said oscillator output, and means responsive to said oscillator output for regularly shifting information stored in said stages to succeeding stages of said storage devices.

15. The combination of claim 14 including means responsive to shifts of an input pulse into said preselected stage of a given storage device for preventing further information shift in said storage device pending said coincident storage of information pulses in said preselected stages of all said storage devices.

16. In a pulse group synchronizer wherein phase displaced trains of successive input pulses are received on a plurality of lines, a plurality of storage registers coupled to said lines respectively, each of said registers comprising a plurality of stages equal in number to the number of possible pulses in each of said trains, means feeding each of said trains independently to a first stage of each of said registers, means for regularly shifting input pulses through the stages of each register to the last stage of each register, means responsive to shift of a pulse into the last stage of a given register for halting further shift in said register, and means responsive to coincident storage of pulses in the last stage of all said registers for effecting simultaneous read-out of said stored pulses from said registers.

17. The combination of claim 16 wherein said last named means comprises further means simultaneously shifting all said registers, and a utilization circuit coupled to a predetermined stage in each of said registers, whereby read-out of said stored pulses to said utilization means occurs during successive shifting of said signals into said predetermined register stages.

18. The combination of claim 16 wherein said shifting means comprises a flywheel oscillator, each of said input trains including control signals related to the pulse repetition rate of possible information pulses in said train, and means responsive to said control signals for variably controlling the output phase of said flywheel oscillator.

19. In a multichannel information circuit wherein trains of input pulses are received on a plurality of input lines respectively, each of said pulse trains comprising a first plurality of control pulses followed by a second plurality of possible information pulses, a plurality of plural stage storage registers coupled respectively to said input lines, each of said registers comprising a plurality of stages corresponding in number to the summation of said first and second pluralities, means for storing said input pulse trains in said plural stage registers during differing time intervals, said last-named means including oscillator means responsive to said control pulses and synchronized thereby, and means responsive to the output of said oscillator means for shifting information stored in said registers, read-out means coupled to said registers, and control means responsive to completion of pulse train storage in all of said registers for operatively controlling said read-out means thereby to effect simultaneous read-out of said stored pulse trains from all said registers.

20. In combination, means producing a plurality of signal trains comprising successive serially occurring signals spaced from one another in each train, a plurality of storage registers corresponding in number to said plurality of trains, each of said registers having a plurality of stages corresponding to a plurality of stages in the others of said registers, means feeding said plurality of trains to said plurality of registers whereby the successive signals of said trains are individually stored in different stages of said registers with each of said trains being stored in a corresponding one of said registers, said feeding means being operative to store the signals of said trains in their corresponding registers during different time intervals respectively, and means responsive to completion of said signal storage in all of said plurality of registers for reading successive parallel groups of signals from said registers, each of said parallel groups comprising signals stored in corresponding stages of said plurality of registers respectively.

21. In combination, means producing a plurality of pulse trains each of which comprises a plurality of serially occurring information pulses, a plurality of plural stage storage registers, means feeding said pulse trains to said registers respectively, first shifting means associated individually with said registers for individually shifting said pulse trains into said registers where they are stored, and second shifting means associated in common with all of said plurality of registers, said second shifting means being normally inoperative and including means operative in response to completion of pulse storage in all of said registers for simultaneously shifting said stored pulses out of all said registers.

22. The combination of claim 21 wherein said second shifting means includes means for rendering said first shifting means inoperative, whereby pulses cannot be shifted into said register during said pulse shift-out.

23. The combination of claim 21 wherein said first and second shifting means are operative at different repetition rates, whereby said pulse shift-in occurs at a rate different from said pulse shift-out.

24. A multichannel information handling system for handling combinations of information signals having variations in phase, said system comprising a plurality of at least three parallel binary information signal channels, each of said channels separately including (1) an input terminal, (2) oscillator means coupled to said input terminal for receiving said information signals and for producing control signals in response thereto and in a certain phase relationship therewith, and (3) signal storage means coupled to said input terminal and to said oscillator means for receiving said information signals and for storing them in response to said control signals, a utilization circuit coupled to the output of each of said storage means and responsive to combinations of simultaneous signals, and means for actuating said storage means to transfer simultaneously the stored signals to said utilization circuit.

25. A circuit for synchronizing the individual signals of a group which appear on separate ones of a plurality of signal lines at different times comprising a plurality of separate registers each for receiving the individual signals from a different one of said signal lines, means operable to store each of the individual signals of said group in a certain stage of the corresponding register, means for providing separate control signals each indicative of the storage of a different one of said individual signals of said group in said certain stage of the corresponding register, and gate means operative to effect a synchronous readout of all said individual signals of said group stored in said certain stages in response to a coincidence of all of said separate control signals.

References Cited in the file of this patent

UNITED STATES PATENTS

| | | |
|---|---|---|
| 2,549,071 | Dusek | Apr. 17, 1951 |
| 2,575,342 | Gridley | Nov. 20, 1951 |
| 2,793,344 | Reynolds | May 21, 1957 |
| 2,935,732 | Guerber | May 3, 1960 |